United States Patent [19]

Tsuchikawa et al.

[11] Patent Number: 5,798,028

[45] Date of Patent: Aug. 25, 1998

[54] PRODUCTION SYSTEM OF ELECTROLYZED WATER

[75] Inventors: Koji Tsuchikawa, Nagoya; Yosuke Saito, Tokai, both of Japan

[73] Assignee: Hoshiazaki Denki Kabushiki Kaisha, Aichi-ken, Japan

[21] Appl. No.: 712,320

[22] Filed: Sep. 11, 1996

[30] Foreign Application Priority Data

May 9, 1994 [JP] Japan ..................................... 6-95277

[51] Int. Cl.$^6$ .................. C25B 9/00; C25B 15/08
[52] U.S. Cl. .................. 204/228; 204/229; 204/257; 204/263
[58] Field of Search .................. 204/228–229, 204/257, 263

[56] References Cited

U.S. PATENT DOCUMENTS 5,282,934  2/1994  Cox ........................ 204/228 X 5,624,535  4/1997  Tsuchikawa et al. .......... 204/229 X

*Primary Examiner*—Donald R. Valentine
*Attorney, Agent, or Firm*—Hazel & Thomas

[57] ABSTRACT

A production system of electrolyzed water includes an electrolyzer the interior of which is subdivided into an anode chamber and a cathode chamber by means of a cation permeable membrane, a diluted brine tank arranged to store an amount of diluted brine to be supplied into the anode and cathode chambers of the electrolyzer, first and second water supply conduits connecting the brine tank to the anode and cathode chambers respectively, and first and second electrically operated hydraulic pumps provided on the first and second water supply conduits to supply the diluted brine from the brine tank into the anode and cathode chambers. To prevent an electric motor for the hydraulic pumps from corrosion caused by backward flow of electrolyzed water in the production system, the hydraulic pumps are deactivated upon the lapse of a predetermined time after application of the DC voltage to an anode and a cathode in the anode and cathode chambers has been interrupted.

4 Claims, 3 Drawing Sheets

5,798,028

1

PRODUCTION SYSTEM OF ELECTROLYZED WATER

BACKGROUND OF THE INVENTION

1. Field of the Invention

The present invention relates to a production system for producing electrolyzed water by electrolysis of water or brine between an anode and a cathode In an electrolyzer.

2. Description of the Prior Art

Illustrated in FIG. 3 is a conventional production system of electrolyzed water of the type which includes a saturated brine tank 70 arranged to store saturated brine prepared by dissolution of water-soluble salt S such as table salt, a diluted brine tank 75 arranged to store diluted brine prepared by dilution of the saturated brine supplied from the saturated brine tank 70 through a discharge conduit 71 and an electrolyzer 90 provided therein with an anode 91 and a cathode 92 for electrolyzing the diluted brine supplied by operation of hydraulic pumps 80 and 81 from the diluted brine tank 75 through brine supply conduits 82 and 83 for production of acid water and alkaline water.

In the production system, the hydraulic pumps 80 and 81 are driven to supply the diluted brine into the bottom portion of electrolyzer 90 in a condition where the anode and cathode 91 and 92 are being applied with DC voltage. When the application of DC voltage to the anode and cathode 91 and 92 is interrupted to stop electrolysis of the diluted brine, the acid water and alkaline water produced by electrolysis of the diluted brine flow backward from the anode and cathode chambers 93 and 94 into the brine supply conduits 82 and 83. This results in corrosion of the component parts of an electric motor for the hydraulic pumps 80 and 81. To avoid such problems as described above, check valves 84 and 85 are provided on the brine supply conduits 82 and 83 respectively to interrupt the backward flow of electrolyzed water into the hydraulic pumps 80 and 81. The provision of the check valves 84 and 85 results In an increase of the component parts of the production system.

SUMMARY OF THE INVENTION

It is, therefore, a primary object of the present invention to provide a production system of electrolyzed water capable of preventing the electric motor for the hydraulic pumps from corrosion caused by backward flow of the electrolyzed water without the provision of the check valves.

According to the present invention, the object is accomplished by providing a production system of electrolyzed water which includes an electrolyzer the interior of which is subdivided into an anode chamber and a cathode chamber by means of a cation permeable membrane, power supply means for applying DC voltage from an electric power source to an anode and a cathode respectively disposed within the anode and cathode chambers, a water tank arranged to store an amount of water to be supplied into the anode and cathode chambers of the electrolyzer, first and second water supply conduits connecting the water tank to the anode and cathode chambers of the electrolyzer respectively, and first and second electrically operated hydraulic pumps provided on the first and second water supply conduits to supply the water from the water tank into the anode and cathode chambers of the electrolyzer, wherein an electric control apparatus for the power supply means and the hydraulic pumps comprises control means for activating the hydraulic pumps when the anode and cathode of the electrolyzer are being applied with the DC voltage under

2 control of the power supply means and for deactivating the hydraulic pumps upon lapse of a predetermined time after the application of the DC voltage to the anode and cathode of the electrolyzer has been interrupted.

BRIEF DESCRIPTION OF THE DRAWINGS

Other objects, features and advantages of the present invention will be readily appreciated from the following detailed description of a preferred embodiment thereof when taken together with the accompanying drawings, in which.

DESCRIPTION OF THE PREFERRED EMBODIMENT

Figure 1:
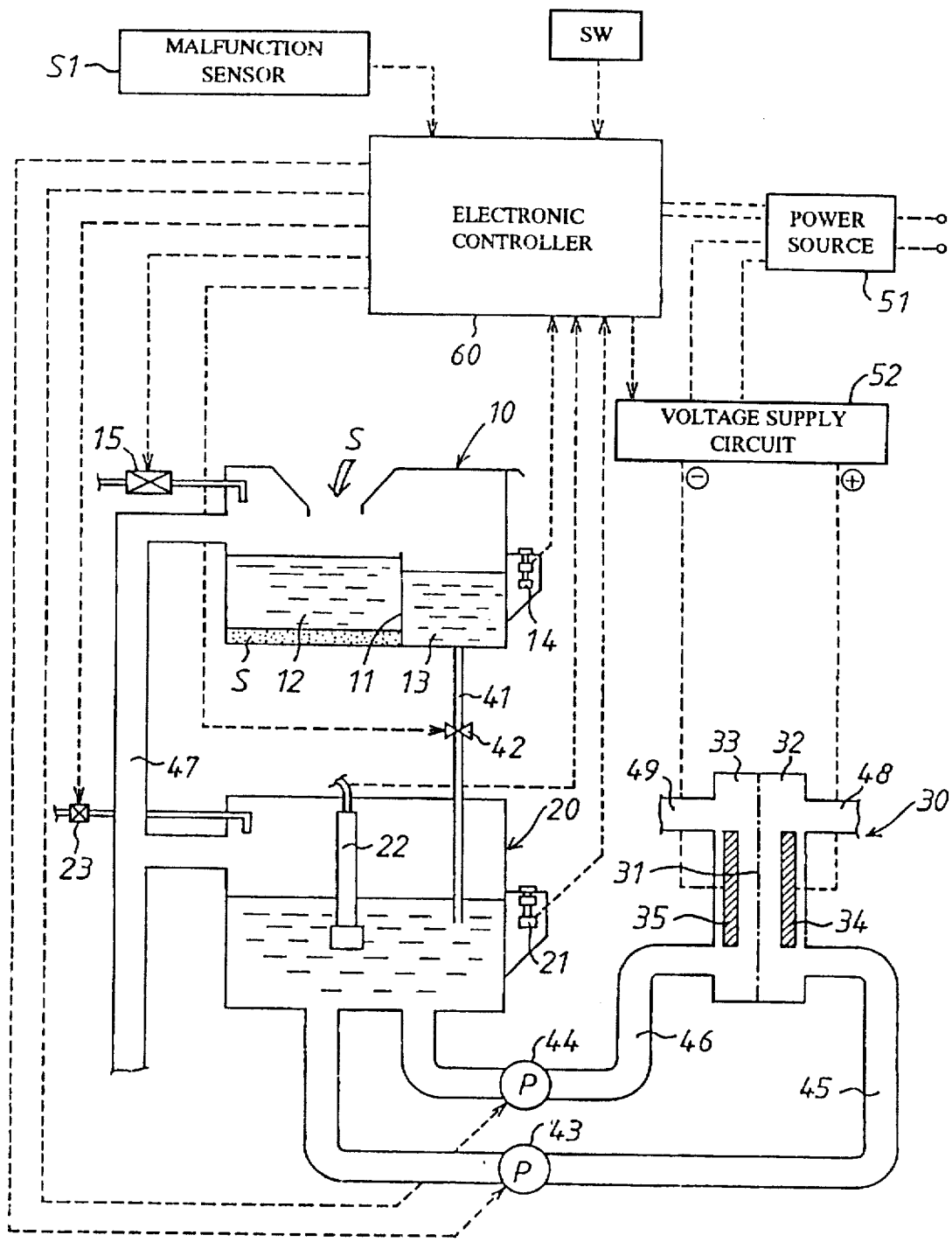
FIG. 1 is a schematic illustration of a production system of electrolyzed water in accordance with the present invention.

In FIG. 1 of the drawings, there is schematically illustrated a preferred embodiment of a production system of electrolyzed water in accordance with the present invention. The production system includes an upper brine tank 10 arranged to store saturated brine of ab  % concentration, a lower brine tank 20 arranged to sto    ted brine of about 0.07% concentration prepared by diluuon of the saturated brine supplied from the upper brine tank 10 through a discharge conduit 41 under control of an electrically operated pinch valve 42 and an electrolyzer 30 the interior of which is subdivided into an anode chamber 32 and a cathode chamber 33 by means of a vertical cation permeable membrane 31. The anode and cathode chambers 32 and 33 are connected to the lower brine tank 20 through brine supply conduits 45 and 46 respectively to be supplied with the diluted brine by means of electrically operated hydraulic pumps 43 and 45. In the electrolyzer 30, the diluted brine from tank 20 is electrolyzed into acid water and alkaline water respectively in the anode chamber 32 and cathode chamber 33. The acid water Is discharged from an outlet duct 48 of the anode chamber 32, while the alkaline water is discharged from an outlet duct 49 of the cathode chamber 33.

The upper brine tank 10 is subdivided into two compartments 12 and 13 by means of a partition wall 11. The first compartment 12 is supplied with an amount of table salt S and supplied with fresh water from an external supply source of water (not shown) under control of an electrically operated water supply valve 15. The second compartment 13 is filled with saturated brine supplied from the first compartment 12 over the partition wall 11. The second compartment 13 is provided with a float type liquid surface sensor 14 which is arranged to detect the level of saturated brine stored in compartment 13. The saturated brine from tank 10 is supplied into the lower brine tank 20 through the discharge conduit 41 as described above. The lower brine tank 20 is provided with a float type liquid surface sensor 21 which is arranged to detect the level of diluted brine stored in tank 20 and with a concentration sensor 22 arranged to detect concentration of the diluted brine In tank 20. The lower brine tank 20 is supplied with fresh water from the external supply source of water under control of an electrically operated water supply valve 23. In addition, an overflow pipe 47 is connected to the upper and lower brine tanks 10 and 20 to discharge an excessive amount of brine over a predetermined level.

In the electrolyzer 30, the anode chamber 32 is provided at its bottom portion with an inlet port in connection to the brine supply conduit 45, while the cathode chamber 33 is provided at its bottom portion with an inlet port in connection to the brine supply conduit 45. The electrolyzer 30 includes an anode 34 and a cathode 35 respectively disposed within the anode chamber 32 and cathode chamber 33 and connected to a power source 51 of direct current through a voltage supplying circuit 52. The power source 51 of direct current is designed to convert AC voltage applied from an external power source of alternative current into DC voltage. In this embodiment, the outlet ducts 48, 49 of electrolyzer 30 are located above the liquid surface of diluted brine in tank 20 so that the brine in electrolyzer 30 flows backward into the brine supply conduits 45 and 46 when the pumps 43 and 44 are deactivated.

The production system of electrolyzed water includes an electronic controller 60 in the form of a microcomputer which is connected to the liquid surface sensors 14, 21 and the concentration sensor 22 and connected to an operation switch SW of the push-on-off type for starting and stopping electrolysis of the diluted brine and a malfunction sensor S1 for detecting malfunction of the DC voltage applied to the anode 34 and cathode 35. The electronic controller 60 is programmed to execute a control program shown by a flow chart in FIG. 2 for controlling each operation of the water supply valves 15, 23, pinch valve 42, hydraulic pumps 43, 44 and voltage supplying circuit 52.

Figure 2:
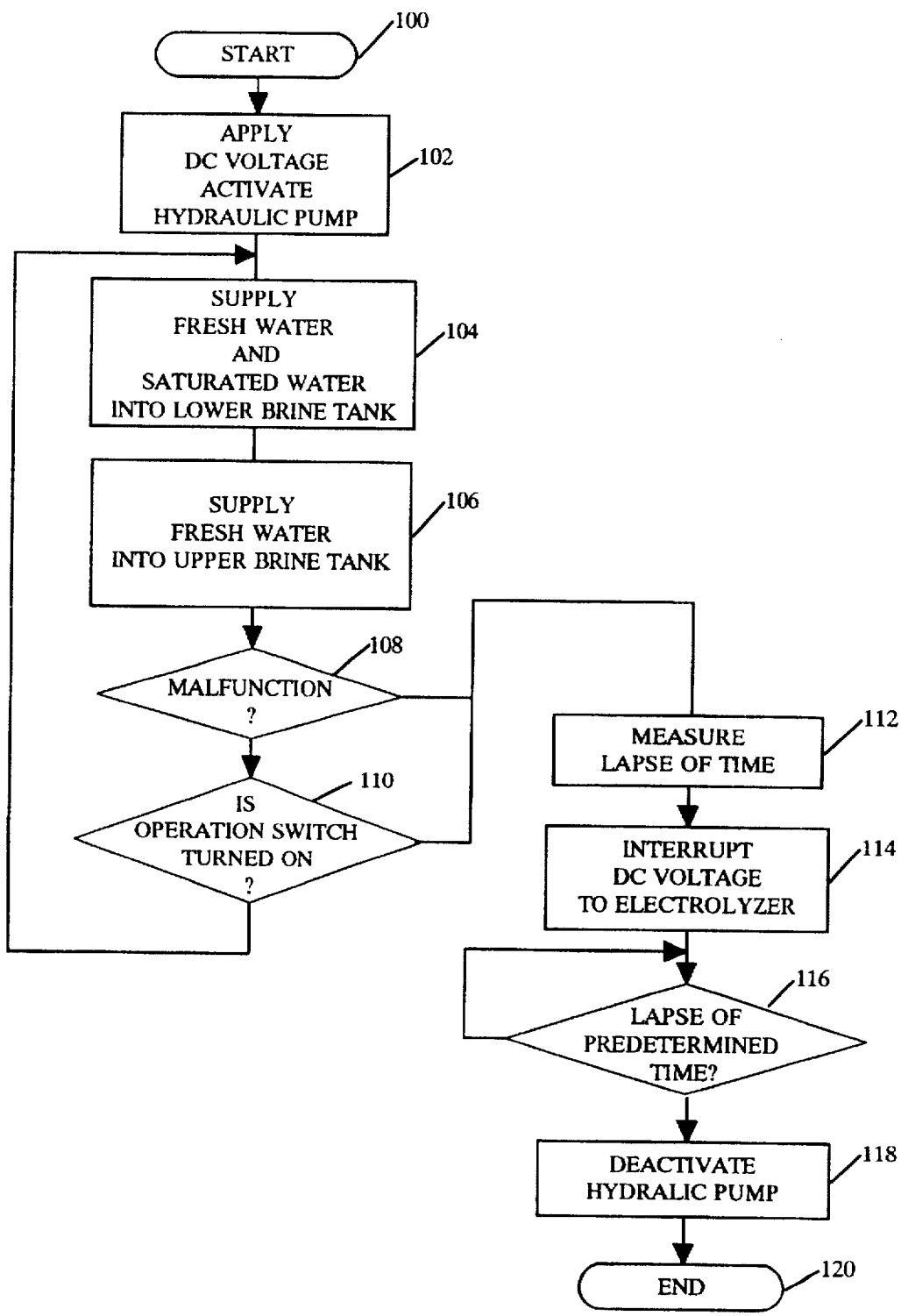
FIG. 2 is a flow chart of a control program executed by an electronic controller shown in FIG. 1.
Figure 3:
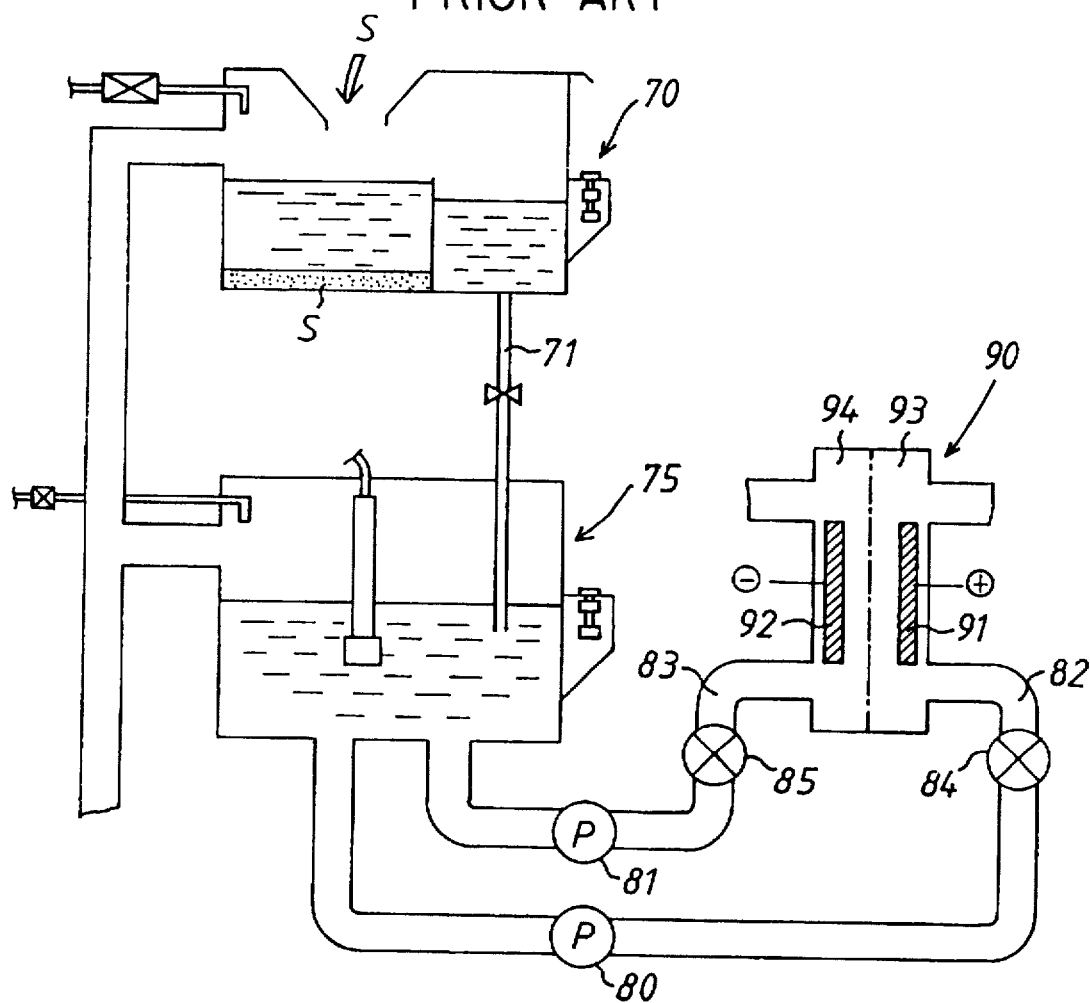
FIG. 3 is a schematic illustration of a conventional production system of electrolyzed water.

Hereinafter, operation of the production system will be described with reference to the flow chart shown in FIG. 2. Assuming that the operation switch SW has been turned on in a condition where a predetermined amount of saturated brine is stored in the upper brine tank 10 and where a predetermined amount of diluted brine is stored in the lower brine tank 20, the controller 60 causes the voltage supplying circuit 52 at step 102 to apply the DC voltage to the anode 34 and cathode 35 of electrolyzer 30 from the power source 51 of direct current and activates the hydraulic pumps 43 and 44 to supply the diluted brine into the electrolyzer 30 from the lower brine tank 20. Thus, the diluted brine in electrolyzer 30 is electrolyzed to produce acid water in the anode chamber 32 and to produce alkaline water in the cathode chamber 33. When the level of diluted brine in tank 20 drops due to production of the acid and alkaline water, the controller 60 controls at step 104 operation of the water supply valve 23 and pinch valve 42 in response to detection signals from the liquid surface sensor 21 and concentration sensor 22 to supply fresh water into the lower brine tank 20 so that the level of diluted brine is maintained at a predetermined level and to supply saturated brine into the lower brine tank 20 from the upper brine tank 10 so that the concentration of diluted brine is maintained at a predetermined value. When the level of saturated brine in the upper brine tank 10 drops due to discharge of the saturated brine into the lower brine tank 20, the controller 60 controls at step 106 operation of the water supply valve 15 in response to a detection signal from the liquid surface sensor 14 to supply fresh water into the upper brine tank 10 so that the level of saturated brine in the second compartment 13 of tank 10 rises up to a predetermined level.

At the following step 108, the controller 60 determines the occurrence of malfunction in the production system. In this instance, the controller 60 determines a "Yes" answer at step 108 if it is detected by the liquid surface sensor 21 that the level of diluted brine in tank 20 is below the lower limit level for one minute, if it is detected by the concentration sensor 22 that the concentration of diluted brine is below the predetermined value for three minutes, or if it is detected by the malfunction sensor S1 that there is a malfunction in the DC voltage applied to the anode and cathode of the electrolyzer 30. If the answer at step 108 is "No", the program proceeds to step 110 where the controller 60 determines whether the operation switch SW has been operated or not. If the answer at step 110 is "No", the controller 60 will repeat processing at step 104 to 110.

If the answer at step 108 becomes "Yes" during processing at step 104 to 110, the controller 60 causes the voltage supplying circuit 52 at step 112 to interrupt application of the DC voltage to the anode 34 and cathode 35 of electrolyzer 30. Subsequently, the controller 60 starts at step 114 to measure the lapse of time after deactivation of the anode 34 and cathode 35. When a predetermined time is measured, the controller 60 determines a "Yes" answer at step 116 and deactivates the hydraulic pumps 43 and 44 at step 118. If the operation switch SW is turned on during processing at step 104 to 110, the controller 60 determines a "Yes" answer at step 110 and causes the program to proceed to step 112. Thus, the controller 60 causes the voltage supplying circuit 52 to interrupt application of the DC voltage to the anode 34 and cathode 35 of electrolyzer 30 and starts at step 114 to measure the lapse of a time after deactivation of the anode 34 and cathode 35. When the predetermined time is measured, the controller 60 determines a "Yes" answer at step 116 and deactivates the hydraulic pumps 43 and 44 at step 118.

From the above description, it will be understood that when the application of the DC voltage to the anode 34 and cathode 35 of electrolyzer 30 has been interrupted, the hydraulic pumps 43 and 44 are deactivated after the lapse of the predetermined time under control of the controller 60. With such control of the hydraulic pumps 43 and 44, the acid water and alkaline water produced in the anode and cathode chambers 32 and 33 are completely discharged from the electrolyzer 30 during the lapse of the predetermined time, and the anode and cathode chambers 32 and 33 are filled with diluted brine supplied from the lower brine tank 20. As a result, even if the diluted brine flows backward into the brine supply conduits 45 and 46 after deactivation of the hydraulic pumps 43 and 44, there will not occur any corrosion of the component parts of the electric motors for the hydraulic pumps 43 and 44.

What is claimed is:

1. A production system of electrolyzed water, comprising:

an electrolyzer, an interior of which is subdivided into an anode chamber and a cathode chamber with a cation permeable membrane;

power supply means for applying a DC voltage from an electric power source to an anode and a cathode respectively disposed within the anode and cathode chambers;

a water tank formed to store an amount of water to be supplied into the anode and cathode chambers of said electrolyzer;

first and second water supply conduits connecting said water tank to the anode and cathode chambers, respectively of said electrolyzer;

first and second electrically operated hydraulic pumps provided on said first and second water supply conduits to supply the water from said water tank to the anode and cathode chambers of said electrolyzer; and an electric control apparatus for controlling said power supply means and said hydraulic pumps, said control apparatus including means for preventing backward flow of electrolyzed water, wherein said preventing means includes means for selectively activating said hydraulic pumps when the anode and cathode of said electrolyzer are being applied with the DC voltage under control of said power supply means and deactivating said hydraulic pumps after the electrolyzed water is completely discharged from both said anode and cathode chambers and after the application of the DC voltage to the anode and cathode of said electrolyzer has been interrupted.

2. A production system of electrolyzed water as claimed in claim 1, wherein said electric control apparatus further comprises detection means for detecting a malfunction in the DC voltage applied to the anode and cathode of said electrolyzer and means responsive to a detection signal from said detection means for interrupting the application of the DC voltage to the anode and cathode of said electrolyzer.

3. A production system of electrolyzed water as claimed in claim 1, wherein said electric control apparatus further includes a liquid surface sensor for detecting the level of diluted brine in said water tank and means responsive to a detection signal from said liquid surface sensor for interrupting the application of the DC voltage to the anode and cathode of said electrolyzer when the level of diluted brine in said water tank being below a lower limit level for a predetermined period of time is detected.

4. A production system of electrolyzed water as claimed in claim 1, wherein said electric control apparatus further includes a concentration sensor for detecting the concentration of diluted brine in said water tank and means responsive to a detection signal from said concentration sensor for interrupting the application of the DC voltage to the anode and cathode of said electrolyzer when the concentration of diluted brine in said water tank being below a predetermined value for a predetermined period of time is detected.

* * * * *